(12) United States Patent
Chou

(10) Patent No.: US 6,177,781 B1
(45) Date of Patent: Jan. 23, 2001

(54) POWER-FACTOR IMPROVEMENT DEVICE

(75) Inventor: Hui-Huang Chou, Tai-Ping (TW)

(73) Assignee: Steve Yiua Shi Yin, Arlington, TX (US)

( * ) Notice: Under 35 U.S.C. 154(b), the term of this patent shall be extended for 0 days.

(21) Appl. No.: 09/577,971

(22) Filed: May 25, 2000

(51) Int. Cl.[7] .................................................... G05F 1/70
(52) U.S. Cl. ........................................... 323/207; 323/285
(58) Field of Search .................................. 323/207, 210, 323/211, 285

(56) References Cited

U.S. PATENT DOCUMENTS

| | | | |
|---|---|---|---|
| 3,801,895 | * 4/1974 | Kanngiesser | 363/35 |
| 4,555,752 | * 11/1985 | Kurosawa | 363/68 |
| 4,683,529 | * 7/1987 | Bucher II | 363/44 |
| 5,359,276 | * 10/1994 | Mammano | 323/207 |
| 6,037,754 | * 3/2000 | Harper | 323/222 |
| 6,104,172 | * 8/2000 | Josephs et al. | 323/222 |

* cited by examiner

Primary Examiner—Adolf Deneke Berhane
(74) Attorney, Agent, or Firm—Bacon & Thomas, PLLC

(57) ABSTRACT

A power-factor improvement device having a voltage stabilizer unit, a current transformer, a voltage and current comparator circuit, an operand microprocessor, a power factor driver, a voltage regulator driver, and a voltage detection circuit, wherein the voltage stabilizer unit regulates the voltage at the load; the current transformer detects the current value at the load and outputs the detected result; the voltage and current comparator circuit compares the current value outputted from the current transformer with the voltage waveform at front and rear ends of the voltage stabilizer unit and outputs a parameter data subject to the comparison result; the operand microprocessor operates the parameter data of the voltage and current comparator circuit for obtaining the best power factor value for driving the power factor driver in controlling capacitance's voltage throw-in and throw-off actions for enabling the power factor of the electric appliance at the load to be adjusted; the voltage detection circuit detects the voltage level and drives the voltage regulator driver in adjusting the pre-set best voltage value for the electric appliance at the load.

5 Claims, 6 Drawing Sheets

POWER-FACTOR IMPROVEMENT DEVICE

BACKGROUND OF THE INVENTION

The present invention relates to a power-factor improvement device, and more particularly to such a power-factor improvement device, which greatly improves the power factor of the electric appliance at the load of AC power supply.

The electric appliances (for example, lighting fixtures, power equipment, air-conditioning systems, and etc.) at the loads have different power factor. The higher the power factor is, the higher the effective power value and the better the quality of the consumption of power supply will be. On the contrary, the lower the power factor is, the higher the consumption of wattless power and the poorer the quality of the consumption of power supply will be.

Nowadays, due to the upsurge of environmental protection concept and the fact that useful natural resources have become more and more less, we must use currently available resources in the best efficient way. "Power supply" is one of the requisite resources in our daily life. It is most urgent to provide a method of efficiently using the resource of power supply.

SUMMARY OF THE INVENTION

The present invention has been accomplished under the circumstances in view. It is one object of the present invention to provide a power factor improvement device, which greatly improves the power factor of the electric appliance at the load. It is another object of the present invention to provide a power factor improvement device, which automatically stabilizes the voltage, keeping the quality of power supply at the best condition. It is still another object of the present invention to provide a power factor improvement device, which automatically drops starting current to protect the electric appliance at the load. It is still another object of the present invention to provide a power factor improvement device, which meets environment protection requirements, enabling the resource of power supply to be consumed in the best efficient way. According to the present invention, the power factor improvement device is comprised of a voltage stabilizer unit, a current transformer, a voltage and current comparator circuit, an operand microprocessor, a power factor driver, a voltage regulator driver, a voltage detection circuit, a low voltage regulator, and a voltage drop rectifier circuit. The voltage stabilizer unit is coupled between the AC power supply input terminal and the load to adjust the voltage required for the electric appliance at the load. The current transformer is connected in series to the front end of the voltage stabilizer unit to detect the value of the current at the load, and to output detected current value data to the voltage and current comparator circuit for comparison. The voltage and current comparator circuit receives the current value data of the load from the current transformer, compares the current value data with the voltage waveform at two opposite ends of the voltage stabilizer unit, and outputs a parameter data subject to the result of the comparison. According to the preferred embodiment of the present invention, the voltage and current comparator circuit comprises a phase comparator, a current capacity adjuster for adjusting the minimum current value, a phase angle adjuster for adjusting the phase angle forwards or backwards, and a power factor adjuster for adjusting the value of the power factor of the electric appliance at the load. The operand microprocessor comprises at least one single-chip controlled to operate the parameter data of the voltage and current comparator circuit for obtaining the best power factor value, enabling the best power factor value to be further transmitted to the power factor driver. The power factor driver is for controlling capacitance's voltage throw-in and throw-off actions, comprising a plurality of control circuits, which are selectively driven by the best power factor value from the operand microprocessor to limit transient current thrown into capacitances at the initial stage, enabling the capacitances to adjust the power factor of the electric appliance at the load. The control circuits of the power factor driver each comprise a relay that is started through two starting stages, so that the service life of the capacitances can be greatly prolonged, the contact capacity of the electromagnetic contactors can be greatly reduced, and the electric appliance at the load can be well protected. The voltage regulator driver comprises a plurality of driving circuits for controlling the operation of the series of coils of the voltage stabilizer unit to keep the voltage of the power supply system stabilized. The voltage detection circuit comprises a voltage comparator controlled to detect the voltage level of the power supply system, and to drive the voltage regulator driver in adjusting the pre-set best voltage value for the electric appliance at the load. The low voltage regulator comprises a voltage stabilizer controlled to provide a stabilized DC power supply to the internal circuit. The voltage drop rectifier circuit provides a first voltage output which is a reference voltage for the voltage detection circuit, a second voltage output which is a driving voltage for the voltage regulator driver, and a third voltage output for the working of the low voltage regulator. Further, the operand microprocessor comprises an additional single-chip controlled to convert the data transmitted from the voltage and current comparator circuit into a digital code for driving a display unit, which is a seven-segment display that indicates the adjusted power factor of the AC power supply input terminal by means of percentage.

DETAILED DESCRIPTION OF THE PREFERRED EMBODIMENT

Figure 1:
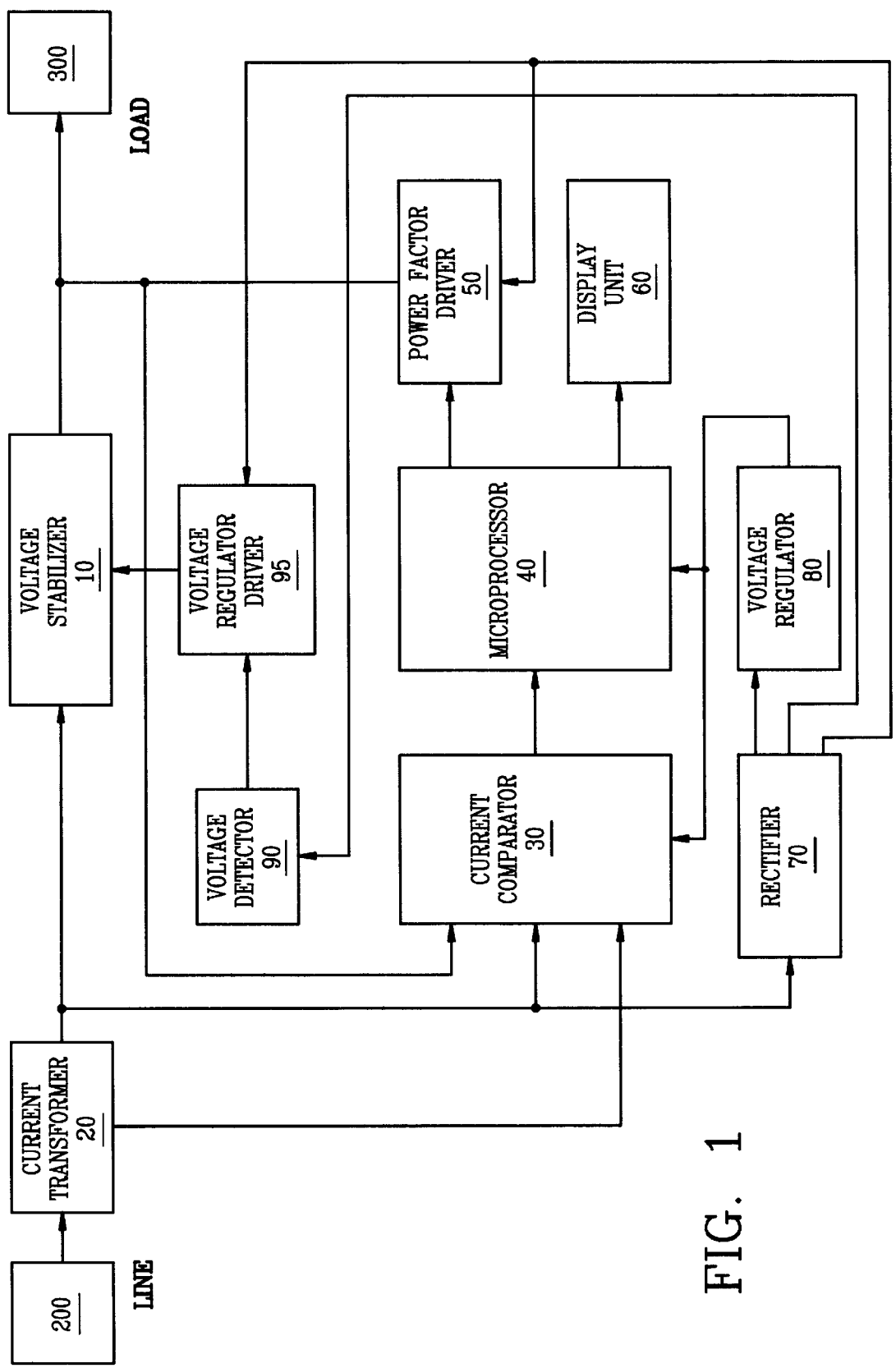
FIG. 1 is a circuit block diagram of the present invention.

Referring to FIG. 1, a power-factor improvement device in accordance with the present invention is generally comprised of a voltage stabilizer unit 10, a current transformer 20, a voltage and current comparator circuit 30, an operand microprocessor 40, a power factor driver 50, a display unit 60, a voltage drop rectifier circuit 70, a low voltage regulator 80, a voltage detection circuit 90, and a voltage regulator driver 95.

Figure 2:
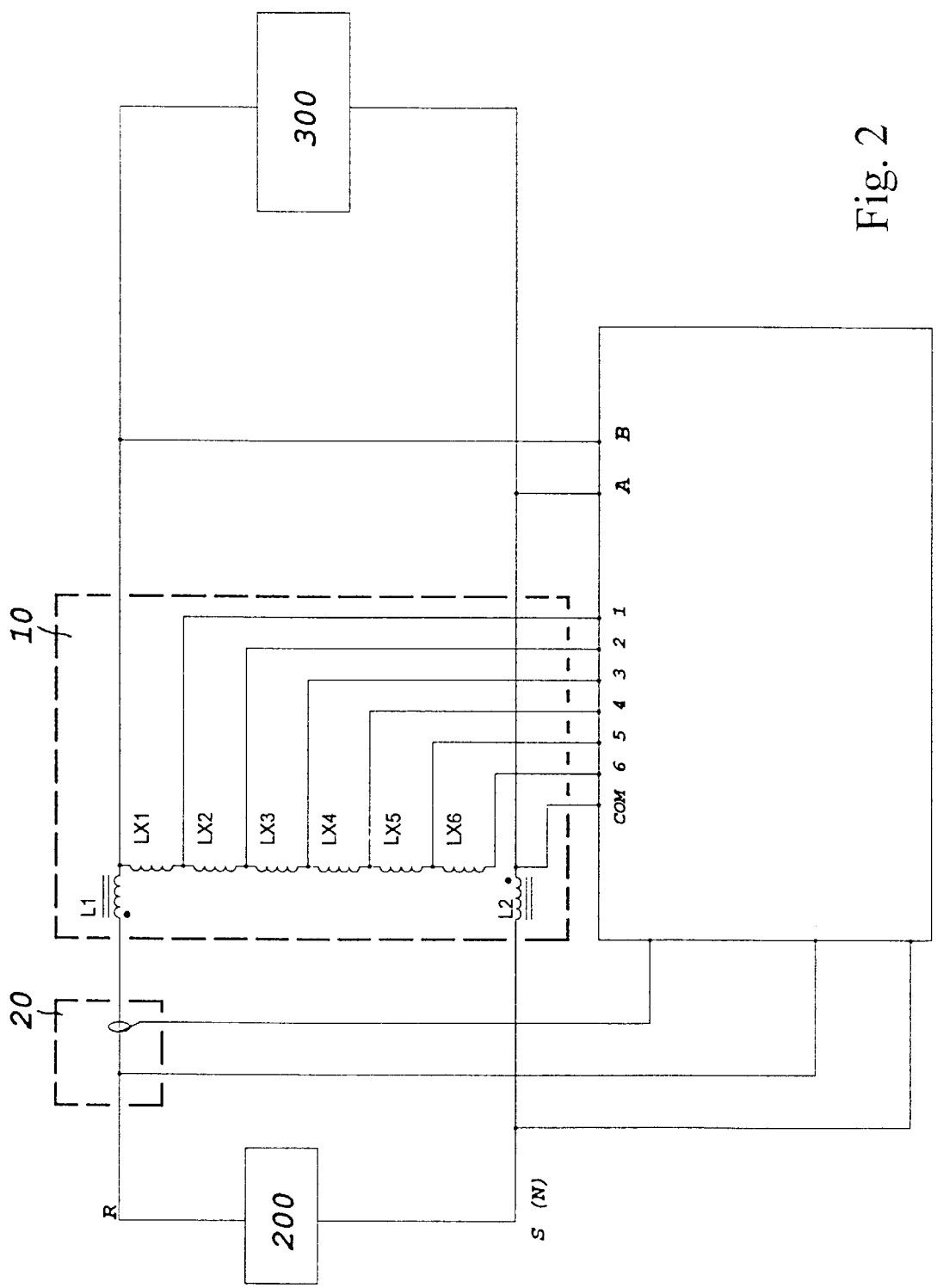
FIG. 2 is a circuit diagram of a part of the present invention.

Referring to FIG. 2, the voltage stabilizer unit 10 comprises two passive inductive reactance coils L1 and L2 respectively disposed at the two ends of the AC power supply input terminal 200, and multiple coils LX1–LX6 connected in series between the passive inductive reactance coils L1 and L2. The passive inductive reactance coils L1 and L2 and the coils LX1–LX6 are commonly wound round a single roll transformer, in which the inductive reactance of the passive inductive reactance coils L1 and L2 is reversely proportional to the number of the coils LX, i.e., the inductive reactance of the passive inductive reactance coils L1 and L2 becomes smaller when the number of the series of coils LX is relatively increased. The inductive reactance controls the voltage difference between the passive inductive reactance coils L1 and L2. The higher the inductive reactance is, the greater the voltage difference will be. Further, the iron core of the transformer can be of external type or internal type.

The current transformer 20 is connected in series to the front end of the voltage stabilizer unit 10. According to the present preferred embodiment, the current transformer 20 is an inductive current transformer whose current ratio varies with the current value at the load 300. The current transformer 20 sends current value data of the load 300 to the voltage and current comparator circuit 30 for comparison.

Figure 3:
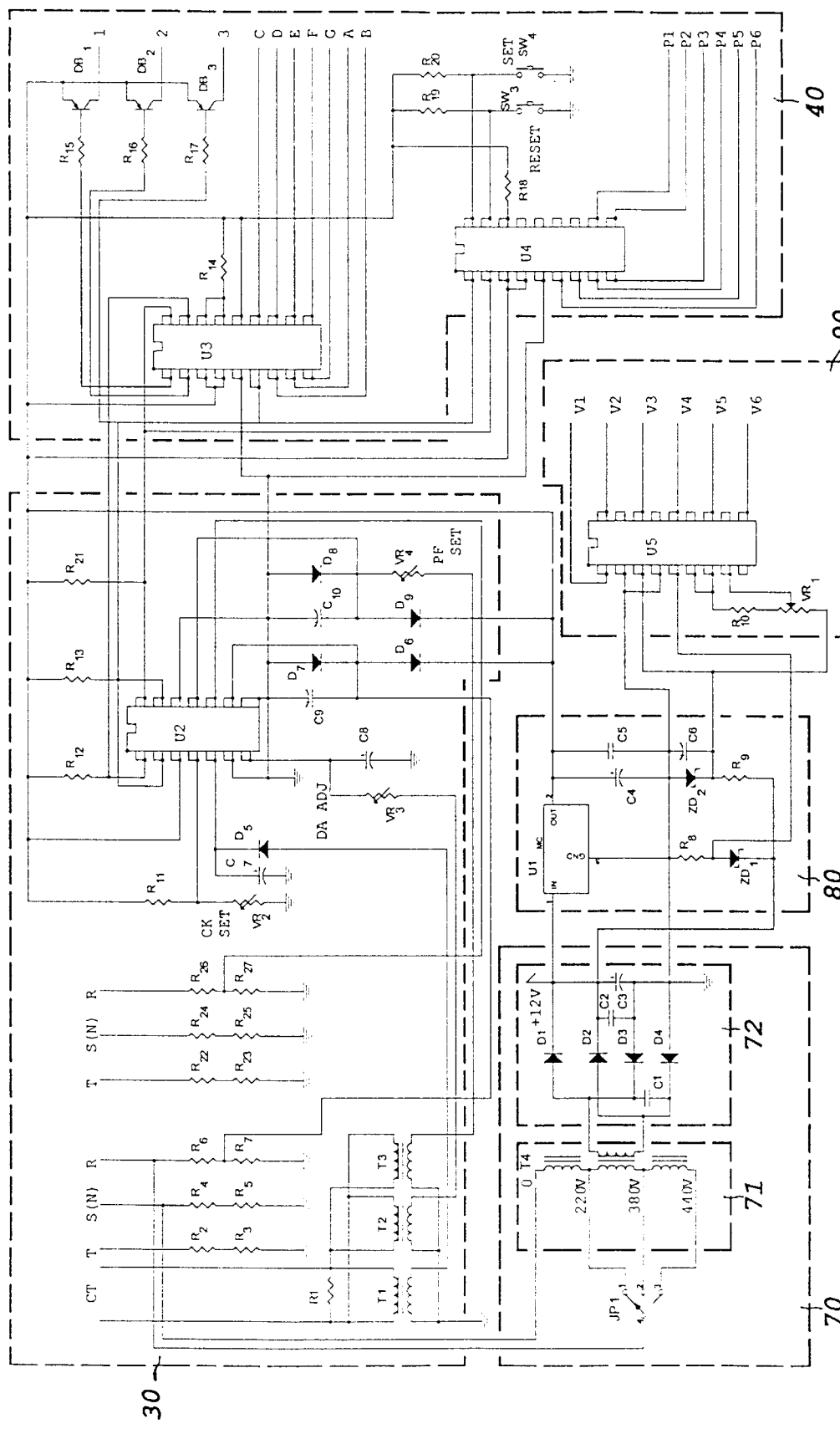
FIG. 3 is a circuit diagram of another part of the present invention.

Referring to FIG. 3, the voltage and current comparator circuit 30 comprises a phase comparator U2, a current capacity adjuster VR2 for adjusting the minimum current value, a phase angle adjuster VR3 for adjusting the phase angle forwards or backwards, and a power factor adjuster VR4 for adjusting the value of power factor. The voltage and current comparator circuit 30 compares the voltage waveform at the two opposite ends of the voltage stabilizer unit 10 with the current value obtained from the load 300 through the current transformer 20, and sends the parameter of the comparison result to the operand microprocessor 40.

The operand microprocessor 40 comprises two single-chips U3 and U4. One single-chip U3 is controlled to convert the data transmitted from the voltage and current comparator circuit 30 into a digital code for driving the display unit 70. The other single-chip U4 is controlled to operate the data transmitted from the voltage and current comparator circuit 30, so as to obtain the best power factor value, enabling the best power factor value to be further transmitted to the power factor driver 50 in the form of a mechanical code. The power factor driver 50 adjusts the best pre-set power factor at the load 300.

Figure 4:
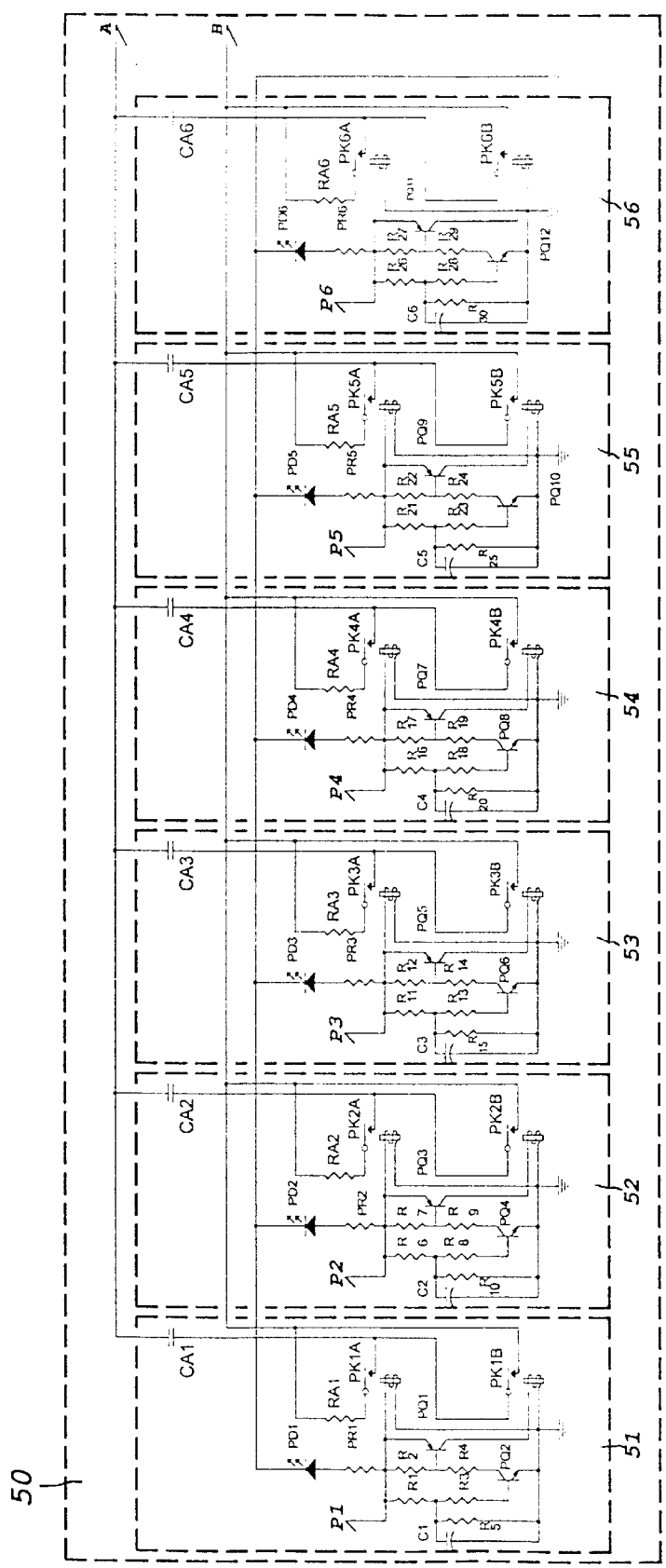
FIG. 4 is a circuit diagram of the power factor driver according to the present invention.

Referring to FIG. 4, the power factor driver 50 controls capacitance's voltage throw-in and throw-off actions, and is comprised of a plurality of control circuits 51–56. The power factor driver 50 limits the transient current of the capacitances CA1–CA6 at the early stage when the capacitances CA1–CA6 are turned on. In FIG. 4, RA1–RA6 are current limit resistors, relays PK1A–PK6A are for first stage start, and relays PK1B–PK6B are for second stage start. Because the relay PK1A is connected in series to the current limit resistor RA1, it effectively smoothens the electric current connected to the capacitance CA1. When P1 guides in a voltage to achieve the term of causing the relay PK1A to work, the relay PK1B short-circuits the current limit resistor RA1 one second after the achieving the condition of causing the relay PK1A to work (the resistor R1 and the capacitor C1 form a timer circuit), and the condition of fully start is achieved.

Figure 5:
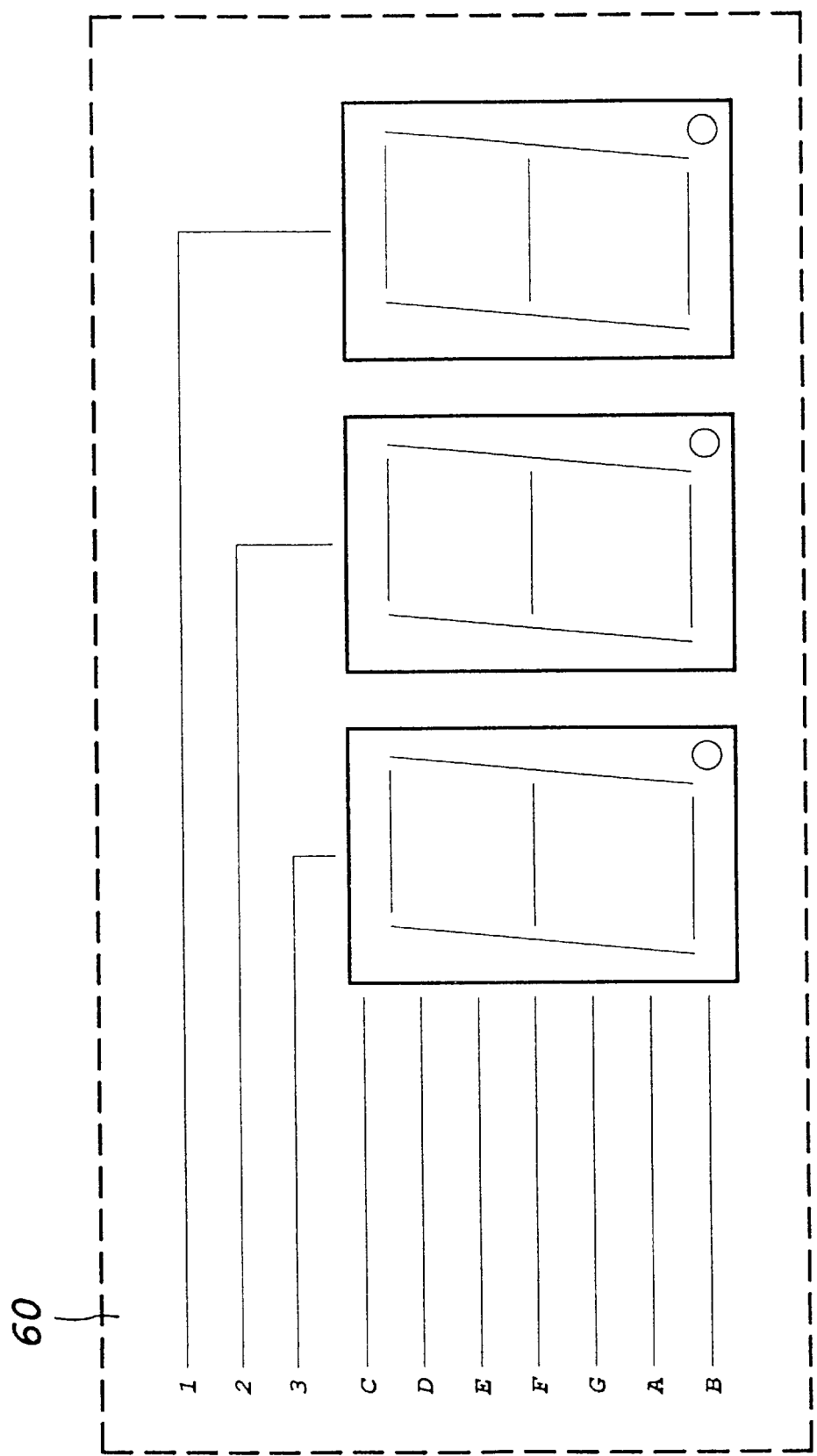
FIG. 5 is a circuit diagram of the display unit according to the present invention.
Figure 6:
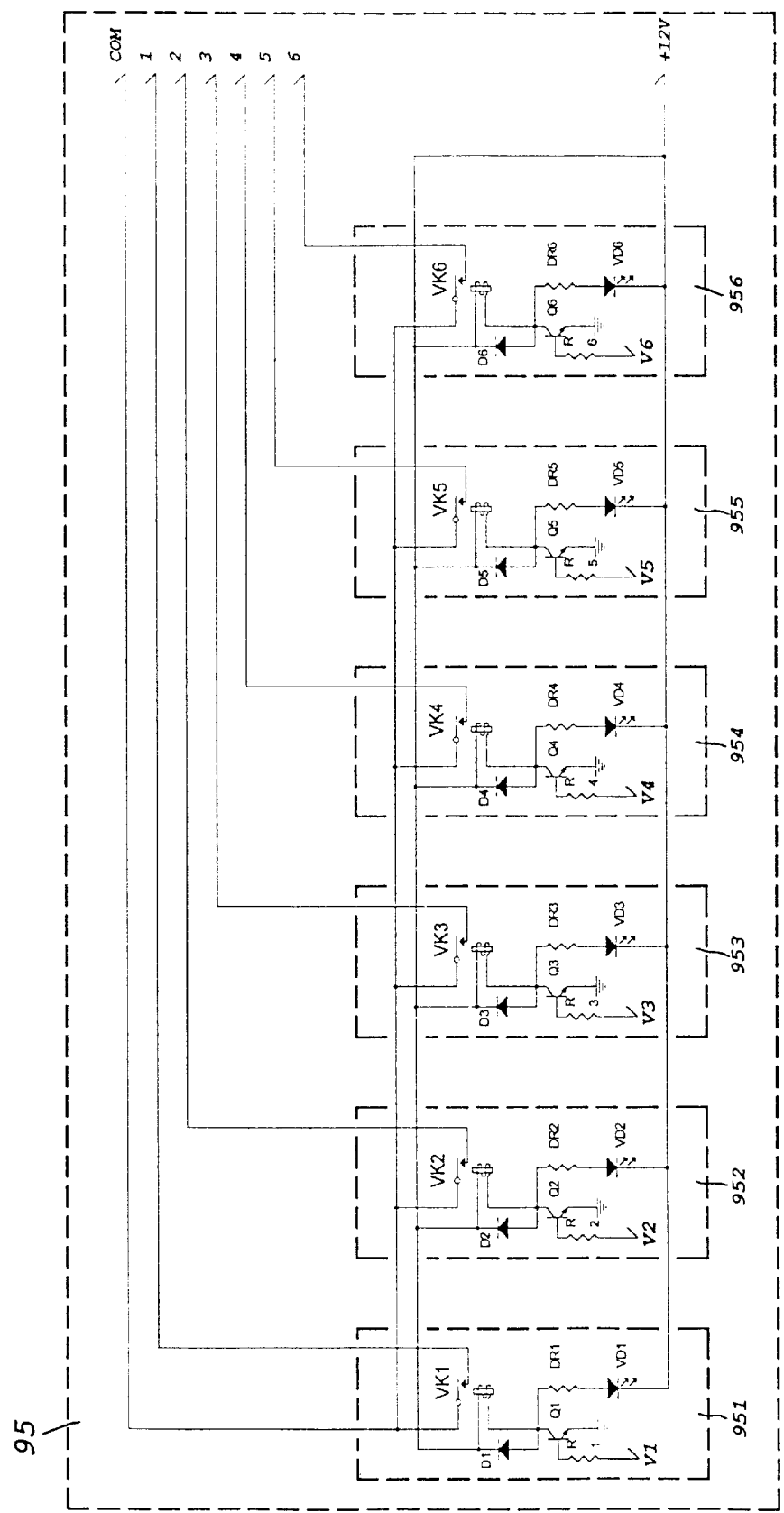
FIG. 6 is a circuit diagram of the voltage regulator driver according to the present invention.

Referring to FIG. 5, the display unit 60 is a seven-segment display, which indicates the adjusted power factor of the AC power supply input terminal 200 by means of percentage.

Referring to FIG. 3 again, the voltage drop rectifier circuit 70 is a standard voltage drop circuit comprised of a voltage drop transformer 71, and a rectifier filter 72. The voltage drop rectifier circuit 70 provides three voltage outputs, namely, the first voltage output which is a reference voltage for the voltage detection circuit 90, the second voltage output which is a driving voltage for the relay, and the third voltage output which is the requisite working voltage for the low voltage regulator 80.

According to the present preferred embodiment, the low voltage regulator 80 is comprised of a voltage stabilizer U1 for use in a voltage stabilizing IC. The voltage stabilizer U1 provides a constant DC power supply to the internal circuit.

According to the present preferred embodiment, the voltage detection circuit 90 comprises a voltage comparator U5. The voltage detection circuit 90 detects the voltage level of the power supply system, and drives the voltage regulator driver 95 to adjust the pre-set best voltage value for the electric appliance at the load 300.

The voltage regulator driver 95 according to the present preferred embodiment comprises a plurality of driving circuits 951–956. It controls relay or electromagnetic contactor means to selectively drive the coils LX1–LX6 of the voltage stabilizer unit 10, keeping the voltage of the power supply system stabilized.

For example, regular city power supply is single-phase AC 115V±5V, and the rated voltage of regular electric appliances is 110V±10V, i.e., the electric appliances can be normally operated under 110V–120V, or a voltage difference above 0V and below 5V (the maximum) is allowed at both ends of the passive inductive reactance coils L1 and L2. The power-factor improvement device of the present invention detects the value of the voltage by means of the voltage detection circuit 90, and automatically adjusts the voltage, keeping the voltage at the load 300 to be constantly maintained within 110V±3V. According to tests, maintaining the voltage at the load 300 stable protects the electric appliance at the load 300 against damage, prolongs the service life of the electric appliance, and improves the quality of power consumption. Further, when the electric current which is consumed by the electric appliance at the load 300 passes the passive inductive reactance coils L1 and L2, a reverse magnetic field is produced to induce the coil LX, causing the coil LX to produce a voltage and an electric current that compensate the voltage loss and current loss due to the presence of the passive inductive reactance coils L1 and L2 in the two ends of the power supply terminal.

The present invention installs the current detector means (i.e., the current transformer 20) in the front end of the voltage stabilizer unit 10, and the capacitance means (i.e., the power factor driver 50) in the rear end of the voltage stabilizer. This arrangement effectively improves the power factor of the electric appliance at the load 300. Because passive inductive reactance coils L1 and L2 serve as inductive reactance means in the voltage stabilizer unit 10, the present invention greatly reduces the demand for the capacity of the capacitance in same wattless power.

The major drawback of conventional capacitances is that transient voltage throw-in shortens the service life of the capacitances. The power factor driver 50 of the present invention enables voltage to be thrown in the capacitance at two steps, so that transient thrown-in current can be smoothened to effectively prolong the service life of the capacitance, and the contact capacity of the electromagnetic contactor can be effectively reduced.

Further, the present invention effectively reduces starting current without affecting normal starting function of the electric appliance at the load 300. As indicated above, the passive inductive reactance coils L1 and L2 of the voltage stabilizer unit 10 serve as inductive reactance means, therefore the higher the electric current is, the greater the magnetic filed and the energy of the induction coil LX will be. A greater energy of the induction coil LX provides much feedback current to the electric appliance at the load 300. Under this condition, the starting current is greatly reduced without affecting normal starting operation of the electric appliance at the load 300.

In addition to the aforesaid application, the circuit of the aforesaid power factor driver 50 can also be used in circuits of other related fields.

As indicated above, the power-factor improvement device of the present invention greatly improves the power factor of the electric appliance at the load and the quality of the consumption of power supply resource, stabilizes the voltage, and reduces the starting current, and protects the electric appliance at the load. While only one embodiment of the present invention has been shown and described, it will be understood that various modifications and changes could be made thereunto without departing from the spirit and scope of the invention disclosed.

What the invention claimed is:

1. A power-factor improvement device used to improve the power factor of an electric appliance at the load of an AC power supply system, comprising:

a voltage stabilizer unit coupled between an AC power supply input terminal of said AC power supply system and said load to adjust the voltage required for the electric appliance at said load, said voltage stabilizer comprising two passive inductive reactance coils respectively disposed at two ends of said power supply input terminal, and a plurality of coils connected in series between said passive inductive reactance coils;

a current transformer connected in series to a front end of said voltage stabilizer unit to detect the value of the current at said load, and to output detected current value data to a voltage and current comparator circuit for comparison;

a voltage and current comparator circuit, which receives the current value data of said load from said current transformer, compares the current value data with the voltage waveform at two opposite ends of said voltage stabilizer unit, and outputs a parameter data subject to the result of the comparison;

an operand microprocessor, said operand microprocessor comprising at least one single-chip controlled to operate the parameter data of said voltage and current comparator circuit for obtaining the best power factor value, enabling the best power factor value to be further transmitted to a power factor driver;

a power factor driver for controlling capacitance's voltage throw-in and throw-off actions, said power factor driver comprising a plurality of control circuits, which are selectively driven by the best power factor value from said operand microprocessor to limit transient current thrown into capacitances at the initial stage, enabling said capacitances to adjust the power factor of the electric appliance at said load;

a voltage regulator driver, said voltage regulator driver comprising a plurality of driving circuits for controlling the operation of the series of coils of said voltage stabilizer unit to keep the voltage of said power supply system stabilized;

a voltage detection circuit, said voltage detection circuit comprising a voltage comparator controlled to detect the voltage level of said power supply system, and to drive said voltage regulator driver in adjusting the pre-set best voltage value for the electric appliance at said load;

a low voltage regulator, said low voltage regulator comprising a voltage stabilizer controlled to provide a stabilized DC power supply to the internal circuit; and a voltage drop rectifier circuit, said voltage drop rectifier circuit providing a first voltage output which is a reference voltage for said voltage detection circuit, a second voltage output which is a driving voltage for said voltage regulator driver, and a third voltage output for the working of said low voltage regulator.

2. The power-factor improvement device of claim 1 wherein said voltage and current comparator circuit comprises a phase comparator, a current capacity adjuster for adjusting the minimum current value, a phase angle adjuster for adjusting the phase angle forwards or backwards, and a power factor adjuster for adjusting the value of the power factor of the electric appliance at said load.

3. The power-factor improvement device of claim 1 wherein said operand microprocessor comprising an additional single-chip controlled to convert the data transmitted from said voltage and current comparator circuit into a digital code for driving a display unit.

4. The power-factor improvement device of claim 3 wherein said display unit is a seven-segment display, which indicates the adjusted power factor of the AC power supply input terminal by means of percentage.

5. The power-factor improvement device of claim 1 wherein the control circuits of said power factor driver each comprise a relay that is started through two starting stages.

* * * * *